(12) United States Patent
Hwang et al.

(10) Patent No.: US 6,977,067 B2
(45) Date of Patent: Dec. 20, 2005

(54) SELECTIVE REMOVAL OF OLEFINS FROM HYDROCARBON FEED STREAMS

(75) Inventors: Shinn H. Hwang, Livingston, NJ (US); Robert J. Farrauto, Princeton, NJ (US)

(73) Assignee: Engelhard Corporation, Iselin, NJ (US)

( * ) Notice: Subject to any disclaimer, the term of this patent is extended or adjusted under 35 U.S.C. 154(b) by 423 days.

(21) Appl. No.: 10/365,165

(22) Filed: Feb. 12, 2003

(65) Prior Publication Data

US 2004/0156778 A1 Aug. 12, 2004

(51) Int. Cl.[7] .............................. C01B 3/26; C01B 31/18
(52) U.S. Cl. .................. 423/651; 423/418.2; 423/652
(58) Field of Search ................... 423/418.2, 650, 423/651, 652

(56) References Cited

U.S. PATENT DOCUMENTS

| | | | |
|---|---|---|---|
| 4,522,894 A | 6/1985 | Hwang et al. ............... 429/17 |
| 6,110,979 A * | 8/2000 | Nataraj et al. ............. 518/704 |
| 6,214,066 B1 * | 4/2001 | Nataraj et al. ............. 48/198.2 |
| 6,335,474 B1 | 1/2002 | Ostberg et al. ............. 585/943 |
| 6,379,645 B1 * | 4/2002 | Bucci et al. ................. 423/655 |
| 6,413,491 B1 | 7/2002 | Aoyama ...................... 423/650 |
| 6,436,363 B1 | 8/2002 | Hwang et al. ............... 423/651 |
| 6,527,980 B1 * | 3/2003 | Roden et al. ................ 252/373 |
| 2001/0041159 A1 | 11/2001 | Tamhankar et al. |
| 2004/0047800 A1 * | 3/2004 | Sennoun et al. ............. 423/652 |

FOREIGN PATENT DOCUMENTS

| | | | | |
|---|---|---|---|---|
| EP | 0 989 094 A2 | 3/2000 | ............ C01B 3/38 |
| EP | 1 077 198 A2 | 2/2001 | ............ C01B 3/40 |
| EP | 1 188 712 A2 | 3/2002 | ............ C01B 3/38 |
| EP | 1 188 713 A2 | 3/2002 | ............ C01B 3/38 |
| WO | WO 01/13452 A1 | 2/2001 | ............ H01M 8/06 |
| WO | WO 01/60773 A1 | 8/2001 | ............ C07C 27/00 |
| WO | WO 02/085781 A1 | 10/2002 | ............ C01B 3/38 |

* cited by examiner

Primary Examiner—Wayne A. Langel
(74) Attorney, Agent, or Firm—Russell G. Lindenfeldar

(57) ABSTRACT

Provided is a method of generating a hydrogen-rich reformate from a hydrocarbon feed stream comprising olefins and alkanes (e.g., LPG). An inlet gas stream containing the hydrocarbon feed stream and an oxygen containing gas stream, is preheated to a temperature of from 180 to 300° C. The preheated inlet gas stream is then contacted with a sulfur tolerant partial oxidation catalyst to form a pre-reformed gas stream, which is preferably maintained below about 400° C. The pre-reformed gas stream is then subjected to a reforming process to form the hydrogen-rich reformate.

18 Claims, 2 Drawing Sheets

SELECTIVE REMOVAL OF OLEFINS FROM HYDROCARBON FEED STREAMS

The present invention relates to a method for pre-reforming a hydrocarbon feed stream, e.g., liquefied propane gas (LPG), that contains alkanes and olefins, e.g., propylene. Pre-reforming is a method conducted prior to a reforming process in the production of hydrogen and/or carbon monoxide rich gas stream (also known as a reformate stream) from a hydrocarbon feed. In the pre-reforming step, the olefins are selectively converted by a catalytic partial oxidation process to produce hydrogen and carbon oxides. The pre-reformed gas stream from the pre-reforming step can be fed to a reforming process, particularly a steam reforming process, further partial oxidation process or autothermal reforming process, for the production of hydrogen and carbon monoxide (or synthesis gas). Among other things, the pre-reforming process of the invention is useful in minimizing or preventing the deposition of coke in the reformer, due to the olefin component in the hydrocarbon feed stream.

Coke formation often accompanies high temperature conversion processes that utilize hydrocarbon feed streams, and is detrimental to the operational efficiency of hydrocarbon reforming equipment. For example, the available reactive surface area of the reforming catalysts can be decreased by the deposition of coke on the surface of the catalyst. The deposition of coke on process equipment can also lead to inefficiencies in heat transfer, as well as unwanted pressure drops.

Difficulties associated with coke formation are of particular concern in reformers used for providing hydrogen to fuel cells since applications such as vehicular and residential applications often mandate smaller scale reformer designs and a minimization of maintenance requirements. As such, equipment and maintenance provisions for the removal of coke that are available in an industrial setting such as in an ammonia plant are unavailable for many fuel cell reformer applications.

The olefin component in a hydrocarbon feed stream, has been implicated as a coke precursor. For example, liquefied propane gas (LPG) is a commonly used hydrocarbon feed stream for reforming processes, including fuel cell reforming processes. HD-5 LPG, a commonly utilized commercial-grade fuel, typically contains between about 1% to 5% propylene in addition to propane. Minor amounts of other components such as other alkane homologs as well as trace amounts of organosulfur compounds are also generally present in LPG. When introduced directly into a molten carbonate and/or solid oxide fuel cell systems, where operating temperature often exceed 700° C., coke can form inside the reformer. The coke can be primarily attributed to the presence of propylene in the LPG. Thus, removal of olefins from the hydrocarbon feed stream would minimize a primary source of coke precursors that are fed to reforming processes.

For certain fuel cell applications, where reduced size, weight and energy requirements are significant, provisions for removal of olefins using conventional techniques such as pressure swing absorption or vacuum swing absorption processes would impose an undue weight and energy requirements on the system. Clearly, new methods that provide reliable and effective removal of olefins from hydrocarbon gas streams before they are introduced into the reformer are needed. More preferably, methods that convert the olefin component of the hydrocarbon feed stream to hydrogen and carbon monoxide precursor, which are typically the desired products of any reforming process, are particularly desirable.

While some reforming processes minimize significant coke formation in the reformer by injection of high proportions of steam or oxygen, such injections often have the undesirable effect of modifying the product composition. For instance, an increased steam to hydrocarbon ratio leads to reduced yields of carbon monoxide by shifting more carbon monoxide over to carbon dioxide. This alteration in the product composition is undesirable, for example, for forming synthesis gas that serves as feedstock for alcohol synthesis. It would be preferable to have a process that avoids such undesirable alterations in the reformate gas composition.

In addition to difficulties related to coke deposition due to the olefin component of the hydrocarbon feed stream, difficulties often arise in the reformer due to sulfur components in the hydrocarbon feed stream, particularly for fuel cell applications. Fuel cell reformers, for example, often contain catalysts that are susceptible to sulfur-mediated deactivation such as nickel-based steam reformer catalysts, and iron- and copper-based water-gas shift catalysts. Hydrocarbon feed streams often contain sulfur components, which are inherently present or have been deliberately added (e.g., odorants such as ethyl mercaptan). Such gas streams are typically contacted at some point with sulfur adsorbents to remove the sulfur components, and maintain the catalytic activities within the fuel cell reformer.

Sulfur components in the hydrocarbon feed stream are often in the form of organosulfur species that can require conversion to another sulfur species, such as hydrogen sulfide, that is more easily adsorbed by conventional sulfur adsorbents, e.g., zinc-based sulfur adsorbents. It would therefore be desirable to have methods that address the remediation of sulfur components in hydrocarbon feed streams in addition to the removal of coke precursors.

SUMMARY OF THE INVENTION

In one aspect, the invention relates to a method of generating a hydrogen-rich reformate from a hydrocarbon feed stream containing olefins and alkanes. The method includes preheating an inlet gas stream containing an oxygen containing gas stream and the hydrocarbon feed stream to a temperature of 180° C. to 300° C., and preferably 180° C. to 250° C. The $O_2/C$ ratio of the inlet gas stream is from about 0.02 to 0.15. Preferably, the inlet gas stream is contacted with the partial oxidation catalyst at a space velocity of at least 10,000 $hr^{-1}$.

The method also includes contacting the preheated inlet gas stream with the sulfur tolerant partial oxidation catalyst to form a pre-reformed gas stream. The sulfur tolerant partial oxidation catalyst preferably contains one or more platinum group metal components. Preferably, the temperature of the pre-reformed gas stream is maintained below about 400° C.

The pre-reformed gas stream is subjected to a reforming process to form a hydrogen-rich reformate. The reforming process is preferably a steam reforming process, catalytic partial oxidation process or autothermal reforming process.

In some embodiments, the inlet gas stream also includes steam in addition to the hydrocarbon feed stream and oxygen. In these embodiments, the $H_2O/C$ ratio in the inlet gas stream is preferably from 1 to 5. In other embodiments, the inlet gas stream is substantially dry.

In another aspect, the invention relates to a method of generating a hydrogen-rich reformate from a hydrocarbon feed stream containing propylene and propane. The method includes preheating an inlet gas stream containing an oxygen containing gas stream and the hydrocarbon feed stream to a temperature of about 180° C. to 250° C. The $O_2/C$ ratio of the inlet gas stream is from about 0.02 to 0.15.

The method also includes contacting the preheated inlet gas stream with a sulfur tolerant partial oxidation catalyst, to form a pre-reformed gas stream, preferably at a space velocity of at least 10,000 $hr^{-1}$. Preferably, the temperature of the pre-reformed gas stream is maintained below about 400° C.

The pre-reformed gas stream is then subjected to a reforming process to form the hydrogen-rich reformate. The reforming process is preferably a steam reforming process, catalytic partial oxidation process or autothermal reforming process. In a preferred embodiment, the pre-reformed gas stream has a propylene concentration that is at least 50% less than propane concentration of the hydrocarbon feed stream.

In some embodiments, the inlet gas stream also includes steam in addition to the hydrocarbon feed stream and oxygen. In these embodiments, the $H_2O/C$ ratio in the inlet gas stream is preferably from 1 to 5. In other embodiments, the inlet gas stream is substantially dry.

In preferred embodiments the sulfur tolerant partial oxidation catalyst contains one or more platinum group metal components. Preferred platinum group metal components include platinum metal components, palladium metal components and rhodium metal components. The sulfur tolerant partial oxidation catalyst is preferably in the form of a coated monolith carrier or a coated heat exchanger.

DEFINITIONS

Figure 1:
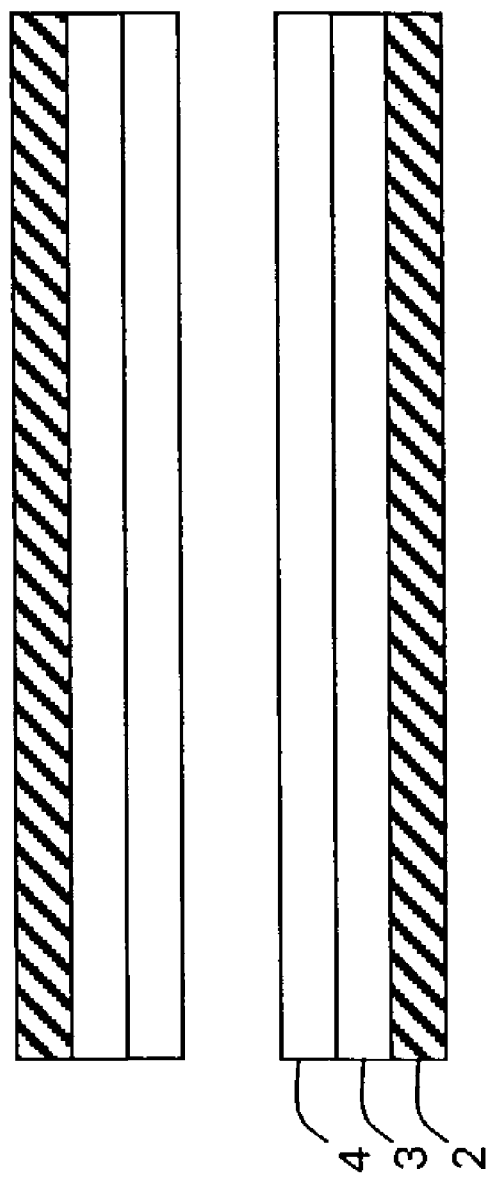
FIG. 1 depicts a sectional view of a single channel of a layered-honeycomb-type monolith catalyst substrate for use with one embodiment of the invention.

The following terms shall have, for the purposes of this application, the respective meanings set forth below.

"Coke" refers to a carbon-rich solid carbonaceous material which can be produced by hydrocarbon cracking and/or carbon monoxide disproportionation reactions. The term coke as used herein is meant to include the conventional meaning known in the art.

"Oxygen to Carbon Ratio" ($O_2/C$) is defined as the molar ratio of oxygen ($O_2$) to total carbon (C) in the inlet gas stream.

"Reforming Processes" as used herein refer to steam reforming, partial oxidation and autothermal reforming of hydrocarbon feed streams to generate hydrogen and carbon oxides.

"Selectivity" refers to the preferential conversion of olefins over alkanes in the pre-reforming method.

"Water to Carbon Ratio" ($H_2O/C$) is defined as the molar ratio of water (steam) to total amount of carbon (C) which is present in the inlet gas stream.

"Weight Percentage" or ("wt. %") refers to the percentage of the specified component on the basis of the weight of the catalyst composition or catalyst layer (when used in the context of washcoat compositions). For platinum group metal components the wt. % is calculated on the basis of the weight of the metal which is supported on oxide supports.

All references herein and in the claims to volumetric hourly rates are at standard temperature and pressure.

DETAILED DESCRIPTION OF THE INVENTION

The present invention relates to a method of generating a hydrogen-rich reformate from a hydrocarbon feed stream comprising olefins and alkanes. An inlet gas stream containing the hydrocarbon feed stream mixed with a small proportion of an oxygen containing gas stream is preheated to a temperature of 180° C. to 300° C. The preheated inlet gas stream is then contacted with a sulfur tolerant partial oxidation catalyst to form a pre-reformed gas stream, which is preferably maintained below about 400° C. The pre-reformed gas stream is then subjected to a reforming process to form the hydrogen-rich reformate.

Reforming processes that utilize the pre-reformed gas stream result in very low levels of coke deposition in the reformer. As compared to reforming processes conducted with untreated olefin containing hydrocarbon feed streams, reformer performance declines much more gradually when conducted with the pre-reformed gas stream due to reduced coke deposition. In particular, the available reactive catalyst surface areas are maintained and pressure drops are minimized within the reformer by conducting the pre-reforming method. As a consequence, conducting reforming processes with the pre-reformed gas stream extends the time period that the reformer can be effectively operated without maintenance due to coke deposition, as compared to conducting reforming processes with untreated olefin containing hydrocarbon feed streams.

The pre-reforming method converts olefins in the hydrocarbon feed stream to useful fuels, i.e., carbon monoxide and hydrogen, which are typically the desired components of the subsequent reforming process. For example, in fuel cell applications, hydrogen is supplied to the fuel cell as fuel, while carbon monoxide can be further converted with steam to additional hydrogen and carbon dioxide using the water-gas shift reaction.

An additional attractive feature of the invention is that sulfur components that are entrained in the hydrocarbon feed stream are converted during the pre-reforming stage into sulfur species, such as hydrogen sulfide, that are easily removed by conventional sulfur adsorbents that are positioned downstream of the pre-reformer. While not being bound by theory, it is believed that the sulfur components are reduced by the hydrogen generated in the pre-reforming step to hydrogen sulfide in the presence of platinum group metal catalysts. Hydrogen sulfide is a sulfur species that can be more readily removed from the reformate gas stream using conventional adsorbents such as zinc and copper containing adsorbents than other sulfur species such as organosulfur compounds. Thus, conventional-sulfur adsorbents mounted downstream of the pre-reforming reactor are more effective at removing sulfur components than are adsorbents used in processes where the pre-reforming reactor is absent.

Another aspect of conducting the pre-reforming method that relates to improved sulfur removal is due to the low olefin content in the pre-reformed gas stream. The decreased olefin content minimizes the competitive adsorption between olefins and sulfur components onto conventional zeolite-type adsorbents. As a result of the decreased olefin content, the zeolite-type adsorbents have a greater capacity for adsorption of sulfur components.

The conditions described herein define an operating range wherein the partial oxidation can be selectively conducted, i.e., the olefins in the hydrocarbon feed stream are selectively reacted in preference to the alkanes present therein. In the inventive pre-reforming method, the hydrocarbon feed stream is combined with an oxygen-containing gas stream to form an inlet gas stream. In particular, the temperature and the $O_2/C$ ratio of this inlet gas stream, as well as the temperature at which the pre-reformed gas stream is maintained are significant.

The inlet gas stream is preheated to a temperature at which the selective oxidation of the olefin component is initiated, which is typically a temperature of from 180° C. to 300° C. For example, in the case of LPG, the inlet gas stream is heated to a temperature of about 180° C. to 250° C. and is fed to the pre-reforming reactor which is maintained at about 180° C. to 250° C. The inlet gas stream is then contacted with the sulfur tolerant partial oxidation catalyst at temperatures necessary to sustain the partial oxidation reaction of olefins, for example in the case of LPG, $\geq$180° C. At inlet temperatures higher than 300° C., the partial oxidation of alkanes present in the inlet gas stream begins to occur to offset the desired oxidation selectivity.

The $O_2/C$ ratio of the inlet gas stream is typically maintained between 0.02 to 0.15 and preferably, is maintained between 0.04 to 0.10. Higher proportions of oxygen in the inlet gas stream than those specified above lead to increased temperatures due to excessive heat generated by the partial oxidation reactions. At higher reactor temperatures, partial oxidation reactions of alkanes can initiate, and offset the desired selectivity for olefin oxidation.

A convenient source of the oxygen containing gas stream is air. In other embodiments, where dilution of the reformate gas stream with nitrogen is undesirable, purified oxygen can be used in the pre-reforming method.

Heat management provisions maintain the gas stream temperature below 400° C. throughout the pre-reforming method. At higher operating temperatures, i.e., above 400° C., the dehydrogenation reaction of alkanes to olefins becomes competitive with the partial oxidation of olefins, especially in the presence of platinum group metal catalysts. This side reaction undermines further efforts to minimize the olefin concentration using the pre-reforming method. For example, in the case of propane as a hydrocarbon feed stream, at temperatures above about 400° C., propane begins to dehydrogenate to form propylene.

Heat management provisions can include injecting the inlet gas stream with water to maintain the temperature of the pre-reformed gas stream below 400° C. As used herein, the term "water" will be understood to encompass steam. Water has a higher heat capacity than other components of the inlet gas-stream, and is used to conduct the heat and carry it out of the pre-reforming reactor. It is also possible in embodiments of the pre-reforming process that are conducted at lower space velocities, that some low-level of steam reforming activity also contributes to the moderation of the temperature of the pre-reformate stream. When water is present in the inlet gas stream, it is preferably present relative to the hydrocarbon in a $H_2O/C$ ratio of about 1 to 5.

Temperature management of the pre-reformed gas stream can be also be achieved by reactor designs that allow exchange of the heat generated in the exothermic oxidation process. For instance, the sulfur tolerant partial oxidation catalyst can be disposed on heat exchangers to effectively conduct the heat generated from the exothermic oxidation reaction from the pre-reforming reactor to maintain the temperature of the pre-reformed gas stream below 400° C. Using such designs it is possible for the inlet gas stream to be substantially dry, and yet still minimize coke formation within the reformer. As used herein when referring to gas streams, the terms "substantially dry" refer to gas streams that contain less than 5%, and preferably less than 1% by volume of water.

The inlet gas stream is preferably fed to the pre-reforming reactor at a space velocity of 10,000 $hr^{-1}$. In embodiments of the invention where the sulfur tolerant partial oxidation catalyst is in particulate form, lower space velocities can be used, such as from about 5,000 $hr^{-1}$.

The hydrocarbon feed stream preferably contains at least 85% by volume of alkanes in order to obtain the desired selectivity of the pre-reforming method. For instance, the method of the invention is particularly useful for hydrocarbon feed streams having an olefin content of from about 0.5% up to about 15% by volume of the total hydrocarbon content of the gas stream, while the remaining hydrocarbons are alkanes. More preferably, the hydrocarbon feed stream contains olefins in a proportion of from 0.5% to 10% by volume of the total hydrocarbon content of the gas stream.

In one preferred embodiment, the hydrocarbon feed stream contains at least 50% by volume of the total hydrocarbon content, a gaseous or readily vaporizable hydrocarbon such as a $C_1-C_4$ alkane, e.g., methane, propane, butane, etc. For instance, a preferred hydrocarbon feed stream is LPG, e.g., HD-5 LPG, which typically contains between 1% and 5% propylene in addition to propane.

In another preferred embodiment, the hydrocarbon feed stream is gasoline. As used herein, the term "gasoline" refers to feed streams containing a mixture of $C_5$ to $C_{10}$ hydrocarbons having a boiling range of about 70° C. to 160° C.

The catalyst utilized in the pre-reforming method is preferably a sulfur tolerant partial oxidation catalyst. The terms "sulfur tolerant" as used herein refer to catalysts whose catalytic activity do not degrade due to the presence of sulfur components in the inlet gas stream. Catalysts having this property allow the method to be conducted continuously, and simultaneously facilitate the conversion of sulfur components in the inlet gas stream. Such sulfur tolerant partial oxidation catalysts include but are not limited to platinum group metal catalysts.

The sulfur tolerant partial oxidation catalyst preferably comprises one or more platinum group metal components. As used herein, the terms "platinum group metal components" refer to the platinum group metals of platinum, palladium, rhodium, iridium, osmium, ruthenium and oxides thereof. Preferred platinum group metal components are palladium, platinum and rhodium components.

The partial oxidation catalyst can be in any form such as in particulate form (e.g., beads, pellets) or in washcoat compositions deposited on honeycomb monolith substrates or on metallic heat exchangers. In preferred embodiments, the partial oxidation catalyst is deposited in washcoat compositions on honeycomb monolith substrates or on metallic heat exchangers.

In particularly preferred embodiment, the sulfur tolerant partial oxidation catalyst is formed on a honeycomb substrate or heat exchanger using a double catalyst layer. The first (or bottom, 3) and second (or top, 4) catalyst layers are present in the form of washcoats which are disposed on the internal surfaces (2) of the monolith substrate as shown in the embodiment depicted in the sectional view of a single passage of the double layered catalyst in FIG. 1. Other layered configurations, such as zoned or graded configurations will be readily apparent to those of skill in the art, and include those disclosed U.S. Pat. No. 6,436,363, which is hereby incorporated by reference as if fully set forth herein.

The washcoat compositions used to form the layers of the sulfur tolerant partial oxidation catalyst typically contain a high surface area refractory oxide support (e.g., γ-alumina) which has been impregnated with the platinum group metal components as well other metal components. Preferably, each layer comprises the catalytic agents (e.g., platinum group metal components) mixed with one or more rare earth metal oxides and/or one or more alkaline earth metal oxides, e.g., one or more oxides of lanthanum, cerium, zirconium, praseodymium, yttrium, calcium, barium, strontium, magnesium and mixtures thereof. Typically, the rare earth metal oxides and/or the alkaline earth metal oxides will be present in an amount of about 2 to about 10 weight percent, based on the weight of the oxides plus γ-alumina, and each washcoat will be present in an amount of about 0.02 to about 5.0 $g/in^3$ of the monolith substrate.

Particularly preferred catalytic agents for use in the first or bottom layer of the catalyst include platinum, palladium and rhodium metal components, especially a mixture containing, on an elemental metal basis, about 10 to about 100% by weight of rhodium components and about 90 to about 0% by weight of platinum components. Typically, the bottom layer will be present in an amount of about 0.1 to about 5.0 $g/in^3$ of the substrate. Typically, the total loading of the platinum group metal components in the first layer will be from 20 $g/ft^3$ to 300 $g/ft^3$.

Preferably, the second (or top) layer contains, on an elemental metal basis, about 10% to about 90% by weight of palladium components, and about 10% to about 90% by weight of platinum components. Typically, the first layer will be present in an amount of about 0.1 to about 3.0 $g/in^3$ of the substrate, and the total loading of the platinum group metal components in the second layer will be from 20 $g/ft^3$ to 200 $g/ft^3$.

The platinum group metal components in the second layer can optionally be supplemented with one or more base metals, particularly base metals of Group VII, Group IB, Group VB and Group VIB of the Periodic Table of Elements. Preferably, the base metal is one or more of iron, cobalt, nickel, and the like.

As an alternative embodiment, the platinum, palladium, and rhodium components can also be formed in admixture in a single washcoat composition, instead of being segregated into two catalyst layers.

The Monolith Substrate

A preferred embodiment of the invention relates to a sulfur tolerant partial oxidation catalyst disposed in one or more washcoat compositions on the surface of a monolith substrate. In one preferred embodiment, the monolith substrate is of the type comprising one or more monolithic bodies having a plurality of finely divided gas flow passages extending therethrough. Such monolith substrates are often referred to as "honeycomb" type substrates and are well known in the prior art. A preferred form of the substrate is made of a refractory, substantially inert, rigid material which is capable of maintaining its shape and a sufficient degree of mechanical conditions at high temperatures of about 1450° C. Typically, a material is selected for use as the substrate which exhibits a low thermal coefficient of expansion, good thermal shock resistance and preferably low thermal conductivity.

Two general types of materials of construction for monolith substrates are known. One is a ceramic-like porous material composed of one or more metal oxides, e.g., alumina, alumina-silica, alumina-silica-titania, mullite, cordierite, zirconia, zirconia-cena, zirconia-spinel, zirconia-mullite, siliconcarbide, etc. A particularly preferred and commercially available material for use as the substrate conducting the pre-reforming method is cordierite, which is an alumina-magnesia-silica material.

Monolith substrates are commercially available in various sizes and configurations. Typically, the monolithic substrate would comprise, e.g., a cordierite member of generally cylindrical configuration (either round or oval in cross section) and having a plurality of parallel gas flow passages of regular polygonal cross sectional extending therethrough. The gas flow passages are typically sized to provide from about 50 to about 1,200, preferably 200–600, gas flow channels per square inch of face area.

The second major type of preferred material of construction for the monolith substrate is a heat- and oxidation-resistant metal, such as stainless steel or an iron-chromium alloy. Monolith substrates are typically fabricated from such materials by placing a flat and a corrugated metal sheet one over the other and rolling the stacked sheets into a tubular configuration about an axis parallel to the configurations, to provide a cylindrical-shaped body having a plurality of fine, parallel gas flow passages, which may range, typically, from about 200 to about 1,200 per square inch of face area.

In another embodiment, the monolith substrate is present in the form of a ceramic or metal foam. Monolith substrates in the form of foams are well known in the prior art, e.g., see U.S. Pat. No. 3,111,396 and SAE Technical Paper 971032, entitled "A New Catalyst Support Structure For Automotive Catalytic Converters" (February 1997).

Figure 2:
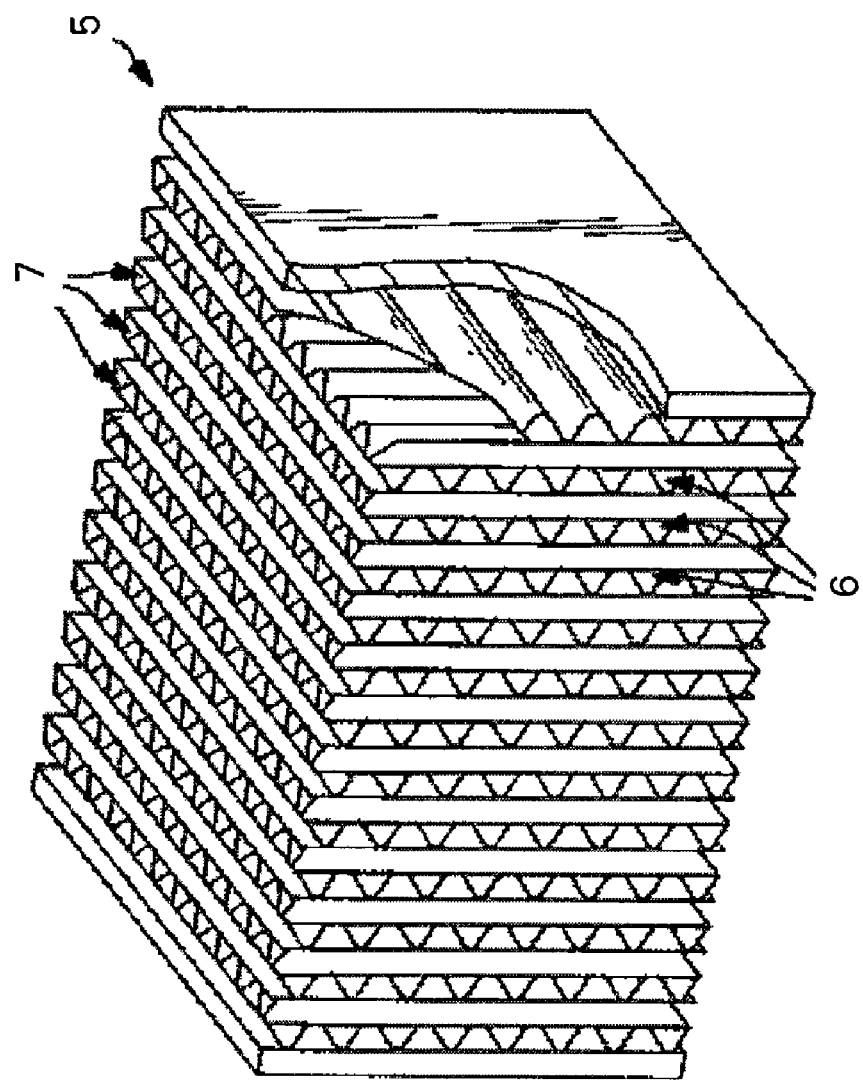
FIG. 2 is a perspective, partially cut away view of a crossflow monolith for use with one embodiment of the invention.

In yet another embodiment of the pre-reforming method, the sulfur-tolerant partial oxidation catalyst is coated as a washcoat composition on a monolith substrate which is in the form of a heat exchanger. The substrate can be a shell-and-tube exchanger, a crossflow monolith or a fin-type exchanger of the type commonly employed in automobile radiators. FIG. 2, for example, is a perspective view of a crossflow monolith (5) that is useful in this embodiment of the invention. The sulfur tolerant partial oxidation catalyst compositions can be disposed in one of the two zones 6 or 7 defined by the walls of the crossflow monolith.

The sulfur tolerant partial oxidation catalyst layer can be deposited directly on the surface of the monolith substrate. In the case of metallic honeycombs or heat exchangers, however, it is preferred that a binder coating be deposited on the surface of a metallic substrate, i.e., interposed between the surface of the monolithic substrate and the sulfur tolerant partial oxidation catalyst layer. Such binder coating will typically be present in an amount of up to about 1.0 $g/in^3$ of the monolith substrate and typically comprises a high surface area alumina.

The invention will be further illustrated by the following nonlimiting examples in which all parts and percentages are on a weight basis, unless otherwise indicated to the contrary.

EXAMPLE 1

Preparation of Partial Oxidation Catalyst a (Double Layer Coated Monolith Substrate)

Preparation of the Top Layer Slurry

Two γ-alumina powders (one having a surface area of 150 $m^2/g$ and the other having a surface area of 225 $m^2/g$ were blended in a 2/1 ratio in a mixer for 5 minutes. The blended γ-alumina powder was then impregnated with a dilute solution of $H_2Pt(OH)_6$ in monoethanolamine, and thereafter impregnated with a dilute solution of palladium nitrate to obtain a loading of 2.65 wt. % Pt and 2.65 wt. % Pd on the γ-alumina powder. This powder was then mixed with a composite of cerium and zirconium oxides (containing 20% $CeO_2$, 5% $NdO_2$ and the balance was $ZrO_2$), and thereafter placed in a 2 gallon ball mill jar where the components were mixed with a mixed solution of cerium acetate, strontium acetate, lanthanum acetate, zirconium acetate, acetic acid and barium hydroxide. Additional water was then added to the ball mill jar to provide a slurry having a solids content of 45%.

The slurry was ball-milled until the particle size was 90% <10 microns. The solids content of the slurry was then further adjusted with additional water to provide a catalytic partial oxidation catalyst slurry having a solids content of 38% having a viscosity of 245 centipoise @ 20° C. and a pH of 4.53. The resulting slurry is described herein as "the top layer slurry."

Preparation of the Bottom Layer

Two γ-alumina powders (one having a surface area of 150 $m^2/g$ and the other having a surface area of 225 $m^2/g$ were blended in a 2/1 ratio in a mixer for 5 minutes. The blended γ-alumina powder was then impregnated with a dilute solution of $H_2Pt(OH)_6$ in monoethanolamine, and thereafter impregnated with a dilute solution of rhodium nitrate to obtain a loading of 0.96 wt. % Pt and 0.48% wt. % Rh on the γ-alumina powder. This powder was then mixed with a composite of cerium and zirconium oxides, and thereafter placed in a 2 gallon ball mill jar where the components were further mixed with a mixed solution of cerium acetate, strontium acetate, zirconium acetate, acetic acid and barium hydroxide. Additional water was then added to the ball mill jar to provide a slurry having a solids content of 45%.

The slurry was ball-milled until the particle size was 90% <10 microns. The solids content of the slurry was then further adjusted with additional water to provide a steam reforming catalyst slurry having a solids content of 38% having a viscosity of 410 centipoise @ 20° C. and a pH of 6.49. The resulting slurry is described herein as "the bottom layer slurry."

Coating of the Double Layer Catalyst

The slurries as prepared above were employed in preparing the substrate containing a double layer catalyst. The double-layered catalyst was formed on a honeycomb-type monolith substrate consisting of a high surface area alumina obtained from Corning Glass Works; the substrate was cylindrical in shape and had a diameter of 1.91 cm, a length of 7.62 cm and 400 cells per $in^2$. The bottom catalyst layer was achieved by dipping the monolith substrate into the bottom layer slurry and the excess slurry was then removed with an air knife to obtain the target wet gain of the washcoat on the monolith substrate. The resultant substrate was then dried for one hour at 120° C., and then calcined at 550° C. in air for two hours. The bottom layer consisted of 2.40 $g/in^3$ of the bottom layer catalyst formulation containing: 46.7 $g/ft^3$ Pt, 23.3 $g/ft^3$ Rh, 1.70 $g/in^3$ $Al_2O_3$, 0.052 $g/in^3$ $CeO_2$, 0.50 $g/in^3$ ceria/zirconia composite (XZO-738 from Magnesium Electron Inc.), 0.040 $g/in^3$ SrO, 0.052 $g/in^3$ ZrO and 0.096 $g/in^3$ BaO.

The substrate containing the bottom layer was then dipped into the top layer slurry and the excess slurry was then removed with an air knife to obtain the target wet gain of the washcoat on the monolith substrate. The resultant substrate was then dried for one hour at 120° C., and then calcined at 550° C. in air for two hours. The top layer consisted of 1.42 $g/in^3$ of the top layer catalyst formulation containing: 41.5 $g/ft^3$ Pt, 41.5 $g/ft^3$ Pd, 0.928 $g/in^3$ $Al_2O_3$, 0.04 $g/in^3$ $CeO_2$, 0.30 $g/in^3$ ceria/zirconia composite, 0.04 $g/in^3$ SrO, 0.033 $g/in^3$ LaO, 0.04 $g/in^3$ ZrO and 0.04 $g/in^3$ BaO.

EXAMPLE 2

Partial Oxidation Catalyst B (Double Layer Coated Monolith Substrate)

Partial Oxidation Catalyst B was prepared using a similar procedure to that described in Example 1. In Partial Oxidation Catalyst B, the bottom layer was deposited on the substrate to a thickness of 1.25 $g/in^3$, and contained 19.0 $g/ft^3$ Pt, 9.5 $g/ft^3$ Rh, 0.885 $g/in^3$ of $Al_2O_3$, 0.027 $g/in^3$ of $CeO_2$, 0.26 $g/in^3$ of ceria/zirconia composite, 0.027 $g/in^3$ of ZrO and 0.05 $g/in^3$ of BaO. The top coat was deposited to a thickness of 0.80 $g/in^3$, and contained 1.19 $g/ft^3$ Pt, 10.75 $g/ft^3$ Pd, 0.522 $g/in^3$ of $Al_2O_3$, 0.169 $g/in^3$ of ceria/zirconia composite, 0.023 $g/in^3$ of $CeO_2$, 0.019 $g/in^3$ of LaO, 0.023 $g/in^3$ of ZrO, 0.023 $g/in^3$ of SrO and 0.023 $g/in^3$ of BaO. (Component concentrations reflect concentrations in the final calcined substrate.)

EXAMPLE 3

Pre-Reforming of Liquified Propane Gas

The resultant catalyst sample was placed inside a laboratory reactor system. Feed gas containing air [at 2.18 Standard Liter Per Minute (SLPM)] and commercial LPG (grade HD-5 at 2.05 SLPM) was introduced into the system by adjusting the mass flow meter setting for each gas, and the feed water was introduced into the reactor via a metering water pump at 8.6 cc/min. The overall space velocity was 23,232 $hr^{-1}$. The dry gas composition of the inlet gas stream was analyzed by an Agilent's Micro GC. The composition of the feed gas was summarized in Column 1 of Table 1 (i.e., values shown at the inlet temperature of 93° C.). By increasing the reactor's inlet temperature to 227° C., propylene gas in the feed stream was selectively converted into product, and the composition of this product was summarized in Column 2 of Table 1.

The test was conducted with the Catalyst A (prepared in Example 1) at four different inlet gas temperatures: 93° C., 227° C., 365° C. and 514° C. The $O_2$/C ratios of the test runs were adjusted to be 0.079, while the $H_2O$/C ratios were set at 4.0. The inlet and outlet temperatures, the dry gas compositions and the percent conversions were as set forth below in Table 1.

As can be seen in Table 1, the conversion of propylene was highest at an inlet temperature of 227° C. At higher inlet temperatures, the conversion of propylene was significantly less due to the-formation of propylene from the dehydrogenation of propane. At an inlet temperature of 514° C., the conversion of propane was apparent.

TABLE 1

| | Inlet Temp. (° C.) | | | | | | |
|---|---|---|---|---|---|---|---|
| | 93 | 227 | | 365 | | 514 | |
| | Outlet Temp. (° C.) | | | | | | |
| | 95 | 450 | | 549 | | 618 | |
| Gas | Dry Gas (%) | Dry Gas (%) | % Conv. | Dry Gas (%) | % Conv. | Dry Gas (%) | % Conv. |
| $H_2$ | | 1.322 | | 2.557 | | 16.320 | |
| $O_2$ | 11.199 | 0.000 | | 0.000 | | 0.000 | |
| $N_2$ | 45.664 | 47.016 | | 46.376 | | 39.695 | |
| $CH_4$ | 0.049 | 0.046 | | 0.033 | | 0.074 | |
| CO | 0.000 | 0.377 | | 1.977 | | 7.051 | |
| $CO_2$ | 0.026 | 7.863 | | 6.964 | | 5.590 | |
| $C_2H_4$ | 0.008 | 0.019 | −137.5 | 0.014 | −75.0 | 0.096 | (1,100.000) |
| $C_2H_6$ | 2.046 | 2.179 | −6.5 | 2.066 | −1.0 | 1.596 | 21.994 |
| $C_3H_8$ | 43.406 | 46.096 | −6.2 | 46.197 | −6.4 | 35.867 | 17.369 |
| $C_3H_6$ | 2.204 | 0.487 | 77.9 | 0.811 | 63.2 | 1.467 | 33.439 |
| $i\text{-}C_4H_{10}$ | 0.044 | 0.010 | 77.3 | 0.016 | 63.6 | 0.029 | 34.091 |
| $n\text{-}C_4H_{10}$ | 0.097 | 0.104 | −7.2 | 0.105 | −8.2 | 0.081 | 16.495 |

A similar test was also conducted with the Catalyst B (prepared as in Example 2) at five different inlet gas temperatures: 104° C., 192° C., 318° C., 497° C. and 606° C. The O2/C ratios of the test runs were adjusted to be 0.081, while the H₂O/C ratios were set at 4.0. The space velocity of the inlet gas stream was 23,232.32 hr⁻¹. The dry gas compositions were as set forth below in Table 2 at 104° C. The inlet temperatures, the dry gas compositions and the % conversions were as set forth below in Table 2.

As can be seen in Table 2, the conversion of the propylene component was highest at an inlet temperature of 192° C. At higher inlet temperatures the conversion of propylene was significantly less. In the trials conducted with the highest inlet temperatures, it was apparent that the conversion of propane was occurring to a significant extent.

TABLE 2

| | Inlet Temp. (° C.) | | | | | | | | |
|---|---|---|---|---|---|---|---|---|---|
| | 104 | 192 | | 318 | | 497 | | 606 | |
| | Outlet Temp. (° C.) | | | | | | | | |
| | 100 | 407 | | 539 | | 605 | | 631 | |
| Gas | Dry Gas (%) | Dry Gas (%) | % Conv. | Dry Gas (%) | % Conv. | Dry Gas (%) | % Conv. | Dry Gas (%) | % Conv. |
| $H_2$ | | 6.04 | | 2.70 | | 17.33 | | 25.54 | |
| $O_2$ | 11.77 | 0.00 | | 0.00 | | 0.00 | | 0.00 | |
| $N_2$ | 44.92 | 45.05 | | 46.33 | | 38.71 | | 32.65 | |
| $CH_4$ | 0.00 | 0.00 | | 0.00 | | 0.03 | | 1.32 | |
| CO | 0.00 | 0.00 | | 3.15 | | 8.26 | | 11.40 | |
| $CO_2$ | 0.03 | 9.05 | | 6.13 | | 4.98 | | 4.60 | |
| $C_2H_4$ | 0.01 | 0.02 | | 0.03 | | 0.17 | | 0.59 | |
| $C_2H_6$ | 2.06 | 2.07 | | 2.09 | | 1.62 | | 1.39 | |
| $C_3H_8$ | 44.47 | 43.96 | | 44.81 | | 33.42 | | 25.59 | |
| $C_3H_6$ | 2.23 | 0.17 | 92.47 | 0.81 | 63.45 | 1.44 | 35.32 | 1.36 | 38.76 |
| $i\text{-}C_4H_{10}$ | 0.10 | 0.10 | | 0.10 | | 0.07 | | 0.06 | |
| $n\text{-}C_4H_{10}$ | 0.00 | 0.00 | | 0.00 | | 0.00 | | 0.00 | |

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A method of generating a hydrogen-rich reformate from a hydrocarbon feed stream comprising olefins and alkanes, comprising:

preheating an inlet gas stream comprising an oxygen containing gas stream and the hydrocarbon feed stream to a temperature of 180° C. to 300° C., wherein the O₂/C ratio of the inlet gas stream is from about 0.02 to 0.15;

contacting the preheated inlet gas stream with a sulfur tolerant partial oxidation catalyst to form a pre-reformed gas stream, wherein a temperature of the pre-reformed gas stream is maintained below about 400° C.; and subjecting the pre-reformed gas stream to a reforming process to form the hydrogen-rich reformate.

2. The method of claim 1, wherein the inlet gas stream is contacted with the sulfur tolerant partial oxidation catalyst at a space velocity of at least 10,000 hr$^{-1}$.

3. The method of claim 1, wherein the inlet gas stream is preheated to a temperature of 180° C. to 250° C.

4. The method of claim 1, wherein the reforming process is a steam reforming process, catalytic partial oxidation process or autothermal reforming process.

5. The method of claim 1, wherein the inlet gas stream further comprises steam.

6. The method of claim 5, wherein the H$_2$O/C ratio in the inlet gas stream is from 1 to 5.

7. The method of claim 1, wherein the inlet gas stream is substantially dry.

8. The method of claim 1, wherein the sulfur tolerant partial oxidation catalyst comprises one or more platinum group metal components.

9. A method of generating a hydrogen-rich reformate from a hydrocarbon feed stream comprising propylene and propane, comprising:
preheating an inlet gas stream comprising an oxygen containing gas stream and the hydrocarbon feed stream to a temperature of about 180° C. to 250° C., wherein the O$_2$/C ratio of the inlet gas stream is from about 0.02 to 0.15;
contacting the preheated inlet gas stream with a sulfur tolerant partial oxidation catalyst, to form a pre-reformed gas stream, wherein a temperature of the pre-reformed gas stream is maintained below about 400° C.; and
subjecting the pre-reformed gas stream to a reforming process to form the hydrogen-rich reformate.

10. The method of claim 9, wherein the pre-reformed gas stream comprises a propylene concentration that is at least 50% less than propane concentration of the hydrocarbon feed stream.

11. The method of claim 9, wherein the reforming process is a steam reforming process, catalytic partial oxidation process or autothermal reforming process.

12. The method of claim 9, wherein the inlet gas stream is contacted with the sulfur tolerant partial oxidation catalyst at a space velocity of at least 10,000 hr$^{-1}$.

13. The method of claim 9, wherein the inlet gas stream further comprises steam.

14. The method of claim 13, wherein the H$_2$O/C ratio in the inlet gas stream is from 1 to 5.

15. The method of claim 9, wherein the hydrocarbon feed stream is substantially dry.

16. The method of claim 9, wherein the sulfur tolerant partial oxidation catalyst comprises one or more platinum group metal components.

17. The method of claim 16, wherein the sulfur tolerant partial oxidation catalyst comprises a platinum metal component, a palladium metal component and a rhodium metal component.

18. The method of claim 9, wherein the sulfur tolerant partial oxidation catalyst is in the form of a coated monolith carrier or a coated heat exchanger.

* * * * *